US012278350B2

(12) United States Patent
Khokhlov et al.

(10) Patent No.: US 12,278,350 B2
(45) Date of Patent: Apr. 15, 2025

(54) RECHARGEABLE CELL ARCHITECTURE

(71) Applicant: Anzode, Inc., San Leandro, CA (US)

(72) Inventors: Pavel Khokhlov, San Ramon, CA (US);
Jonathan Truskier, Oakland, CA (US);
Marc Juzkow, Livermore, CA (US)

(73) Assignee: Zelos Energy Ltd., San Leandro, CA (US)

( * ) Notice: Subject to any disclaimer, the term of this patent is extended or adjusted under 35 U.S.C. 154(b) by 0 days.

(21) Appl. No.: 17/347,266

(22) Filed: Jun. 14, 2021

(65) Prior Publication Data
US 2022/0399588 A1 Dec. 15, 2022

(51) Int. Cl.
*H01M 10/05* (2010.01)
*H01M 4/24* (2006.01)
*H01M 4/505* (2010.01)
*H01M 10/44* (2006.01)
*H01M 10/52* (2006.01)
*H01M 50/30* (2021.01)

(52) U.S. Cl.
CPC ........... *H01M 10/52* (2013.01); *H01M 4/244* (2013.01); *H01M 4/505* (2013.01); *H01M 10/445* (2013.01); *H01M 50/30* (2021.01)

(58) Field of Classification Search
CPC .. H01M 10/52; H01M 10/526; H01M 10/445; H01M 50/30; H01M 50/35; H01M 50/358; H01M 50/367; H01M 4/244; H01M 4/505
See application file for complete search history.

(56) References Cited

U.S. PATENT DOCUMENTS

| 5,516,604 A | 5/1996 | Mieczkowska et al. |
| 6,261,720 B1 | 7/2001 | Kimiya et al. |
| 2012/0320492 A1 | 12/2012 | Radivojevic et al. |
| 2015/0311503 A1 | 10/2015 | Ingale et al. |

(Continued)

FOREIGN PATENT DOCUMENTS

| CN | 103560241 | * | 2/2014 | .............. H01M 4/50 |
| JP | S51110631 | | 9/1976 | |
| JP | 57121172 A | | 7/1982 | |

(Continued)

OTHER PUBLICATIONS

Machine-generated translation of CN 103560241, Wu et al., "Button-type Alkaline Zinc/manganese Dioxide Battery Special Electrolytic Manganese Dioxide Textured By Nanofibre And Preparation Method", May 2, 2014.*

(Continued)

*Primary Examiner* — Raymond Alejandro
(74) *Attorney, Agent, or Firm* — David R. Stevens; Stevens Law Group

(57) ABSTRACT

A rechargeable battery cell a casing and first and second electrode materials separately positioned in the casing. A mechanical impulse element is positioned to mechanically move and dislodge gas bubbles from at least one of the first and second electrode materials in response to activation. In some embodiments the mechanical impulse element can include a vibratory piezoelectric element. In other embodiments, a gas vent in the battery cell can be used to release dislodged gas bubbles.

11 Claims, 11 Drawing Sheets

(56) References Cited

U.S. PATENT DOCUMENTS

2017/0331157 A1    11/2017   Newman et al.

FOREIGN PATENT DOCUMENTS

| JP | 5812403 | 11/2015 |
|---|---|---|
| KR | 20100130685 A | 12/2010 |
| KR | 101802295 B1 | 11/2017 |

OTHER PUBLICATIONS

Daniel Stock et al, "Towards zinc-oxygen batteries with enhanced cycling stability: The benefit of anion-exchange ionomer for zinc sponge anodes," Journal of Power Sources, vol. 395, Jun. 15, 2018, pp. 195-204, XP055699794, Amsterdam, NL ISSN: 0378-7753, DOI: 10.1016/j.jpowsour.2018.05.079, * abstract; figures 1a-4c * * p. 196, left-hand column, paragraph Experimental—p. 203, right-hand column, paragraph Conclusion *.

* cited by examiner

RECHARGEABLE CELL ARCHITECTURE

TECHNICAL FIELD

The present disclosure relates generally to the field of batteries and components for batteries. More specifically, the present application relates to batteries or cells having an attached mechanical impulse element such as a piezoelectric vibrator to promote dislodgement or freeing of gas generated on electrode surfaces or trapped in a separator or other membrane.

BACKGROUND

There is a great demand for low cost rechargeable battery systems with a high energy density for portable devices, electric vehicles, grid storage and other applications. Recently lithium ion batteries have become a popular technology of choice for many energy storage applications. Unfortunately, limited availability of key metals, high energy costs and safety risks associated with Li-ion technology limit wide adoption of the batteries in many application. Easily manufacturable batteries using low cost materials are needed for many applications.

Unfortunately, many widely utilized battery cell electrochemical systems generate gasses during charge, recharge, or discharge that can reduce battery efficiency. For example, during charging a $Zn/MnO_2$ battery cell can consume $OH-$ to produce $O_2$ or consume $H_2O$ to produce $H2$ via the following reactions:

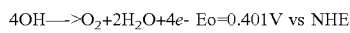

$4OH- \rightarrow O_2 + 2H_2O + 4e-$ Eo=0.401V vs NHE

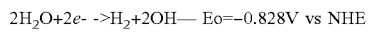

$2H_2O + 2e- \rightarrow H_2 + 2OH-$ Eo=-0.828V vs NHE

Systems and procedures that reduce or eliminate issues associated with gas production in battery cells are needed.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In some embodiments, as described with respect to the disclosed Figures and specification, a rechargeable battery cell includes a casing and first and second electrode materials separately positioned in the casing. A mechanical impulse element is positioned to mechanically move and dislodge gas bubbles from at least one of the first and second electrode materials in response to activation. In some embodiments the mechanical impulse element can include a vibratory piezoelectric element. In other embodiments, a gas vent in the battery cell can be used to release dislodged gas bubbles.

Figure 1A:
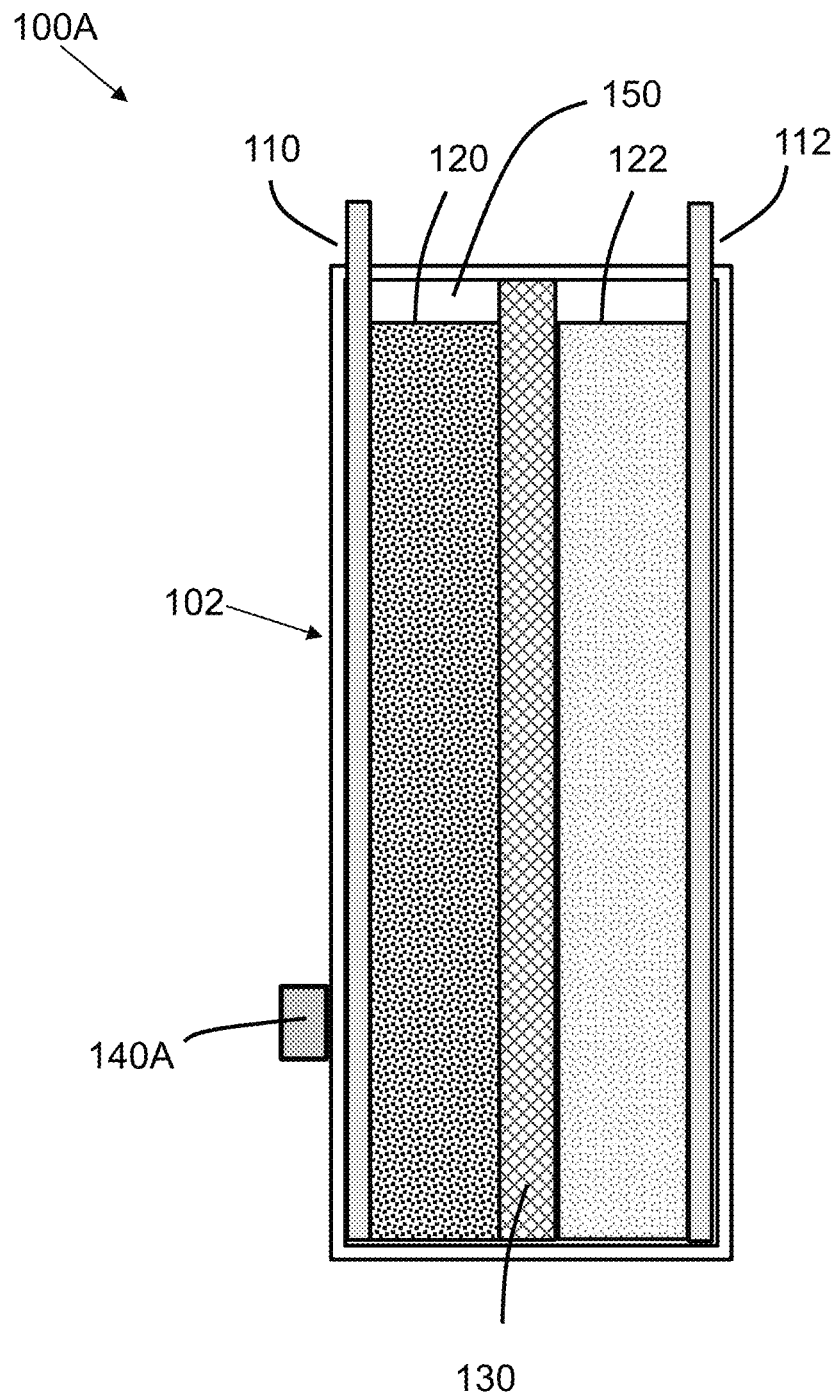
FIG. 1A illustrates a rechargeable battery system with a casing mounted mechanical impulse element.

FIG. 1A illustrates a rechargeable battery system 100A with a casing mounted mechanical impulse element. More specifically, FIG. 1A illustrates a rechargeable battery cell system 100A that includes a casing 102 that surrounds various battery components. Battery components can include current collectors 110 and 112 that facilitate charge and discharge of the battery cell system 100A. Other components include electrode materials 120 and 122 that respectively contact current collectors 110 and 112. The electrode materials 120 and 122 are separated from each other by a separator 130 that only permits ion flow between the material, allowing the electrode materials to act as anodes or cathodes during charge and discharge. Additionally, the rechargeable battery cell system 100A includes a piezoelectric element 140A attached to the casing 102A. When activated, vibratory mechanical impulses by the piezoelectric element 140A can cause mechanical movement and dislodgement of gas bubbles from at least one of the first and second electrode materials in response to activation. In some embodiments, dislodged gas can be vented, collected in open space 150, chemically converted into a non-gaseous form, or redistributed throughout the battery cell to equalize local gas pressure.

In some embodiments, piezoelectric element 140A can be constructed from thin diaphragm type ceramic disks to minimize needed accommodation volume within the battery cell system 100A. Example piezoelectric diaphragms can include the 7BB series from Murata. These piezoelectric diaphragms are piezoelectric ceramic disks adhered to a metal plates of brass and are available in external drive and self-drive types. Since piezoelectric elements generally require relatively high voltages for operation, space efficient piezoelectric driver integrated circuits can be incorporated into a battery cell or battery pack. These ICs normally require an input of 3 to 5 VDC. In some embodiments, complete with other components, such circuit boards can be as small as approximately 15×15 mm. Alternate drivers that can operated as low as 1V can be used, as well as use of external charger voltage that can be stepped up to run the IC. Piezoelectric vibrations are preferentially generated during the charge sequence using excess power from the external charger as opposed to running it from the cell(s) when disconnected from the charger. Piezoelectric elements can be used in multi-cell modules/packs.

In some embodiments, piezoelectric elements can be replaced or supplemented with other systems capable of providing a mechanical impulse or vibration sufficient to dislodge. Such systems can include but are not limited to mechanical or electromechanical strikers, capacitive based systems, phase change materials, volume or shape changing materials, or any other suitable system able to provide one or more mechanical pulses to dislodge gasses. In one application, electromechanical acoustic vibrations such as can be provided by a power portable battery powered speaker mechanically coupled to a battery cell can be used. Vibrations generated by these audio speakers can incidentally generate vibrations used promote gas bubble removal from the electrodes and membranes of the internal cells. In another application, an external charger can be include a vibration element able to shake a battery intermittently or continuously throughout the charging process.

Figure 1B:
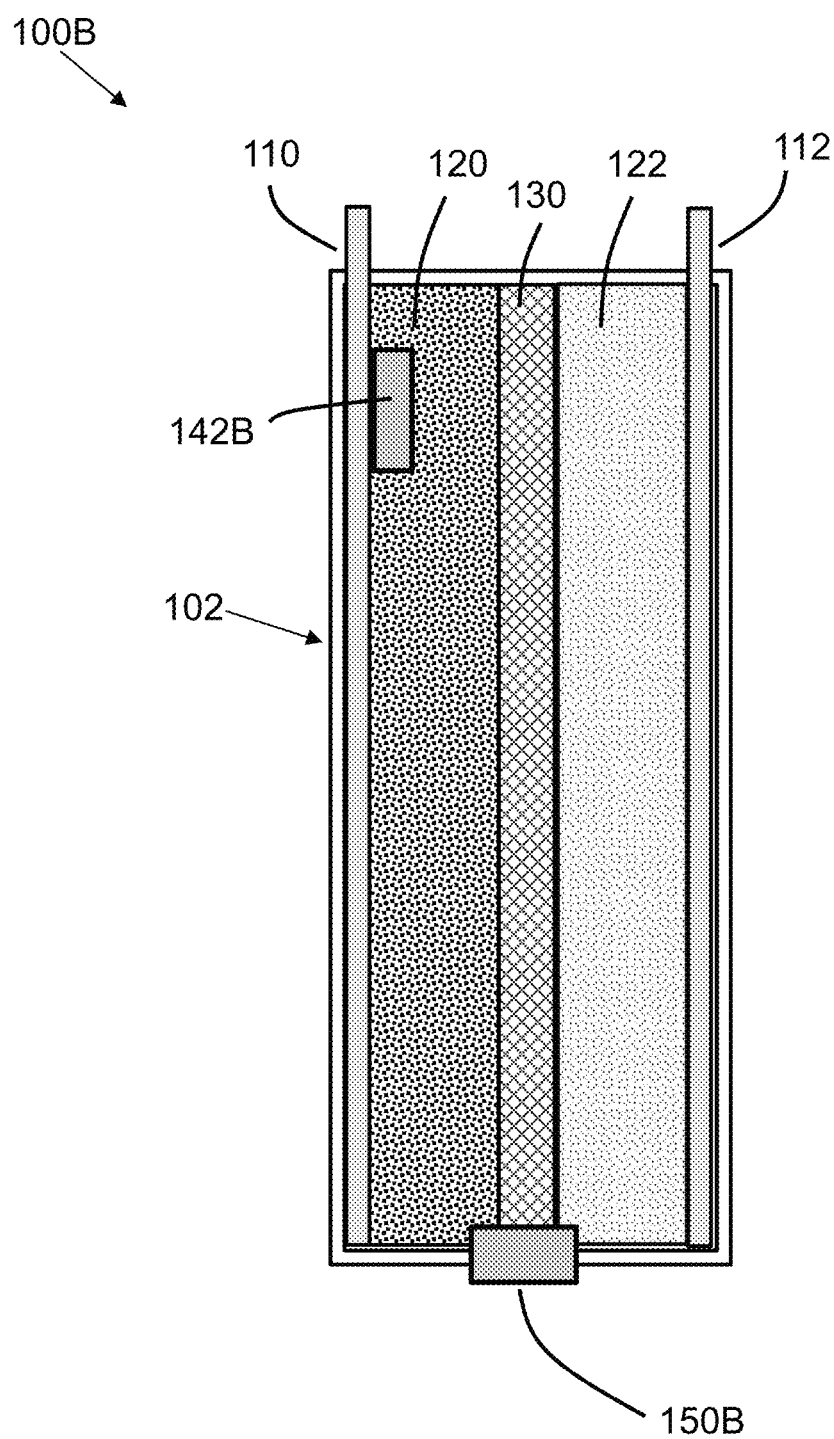
FIG. 1B illustrates a rechargeable battery system with a collector mounted mechanical impulse element and a gas vent.

FIG. 1B illustrates a rechargeable battery system 100B with a collector mounted mechanical impulse element and a gas vent. In this embodiment, vibratory mechanical impulses are provided by a piezoelectric element 140B attached to a collectors 110 to cause mechanical movement and dislodgement of gas bubbles from at least one of the electrode materials 120 and 122 in response to activation. The dislodged gas bubbles can be released into atmosphere using a vent 150B that is at least partially situated in gaseous communication with both electrode materials 120 and 122.

Figure 1C:
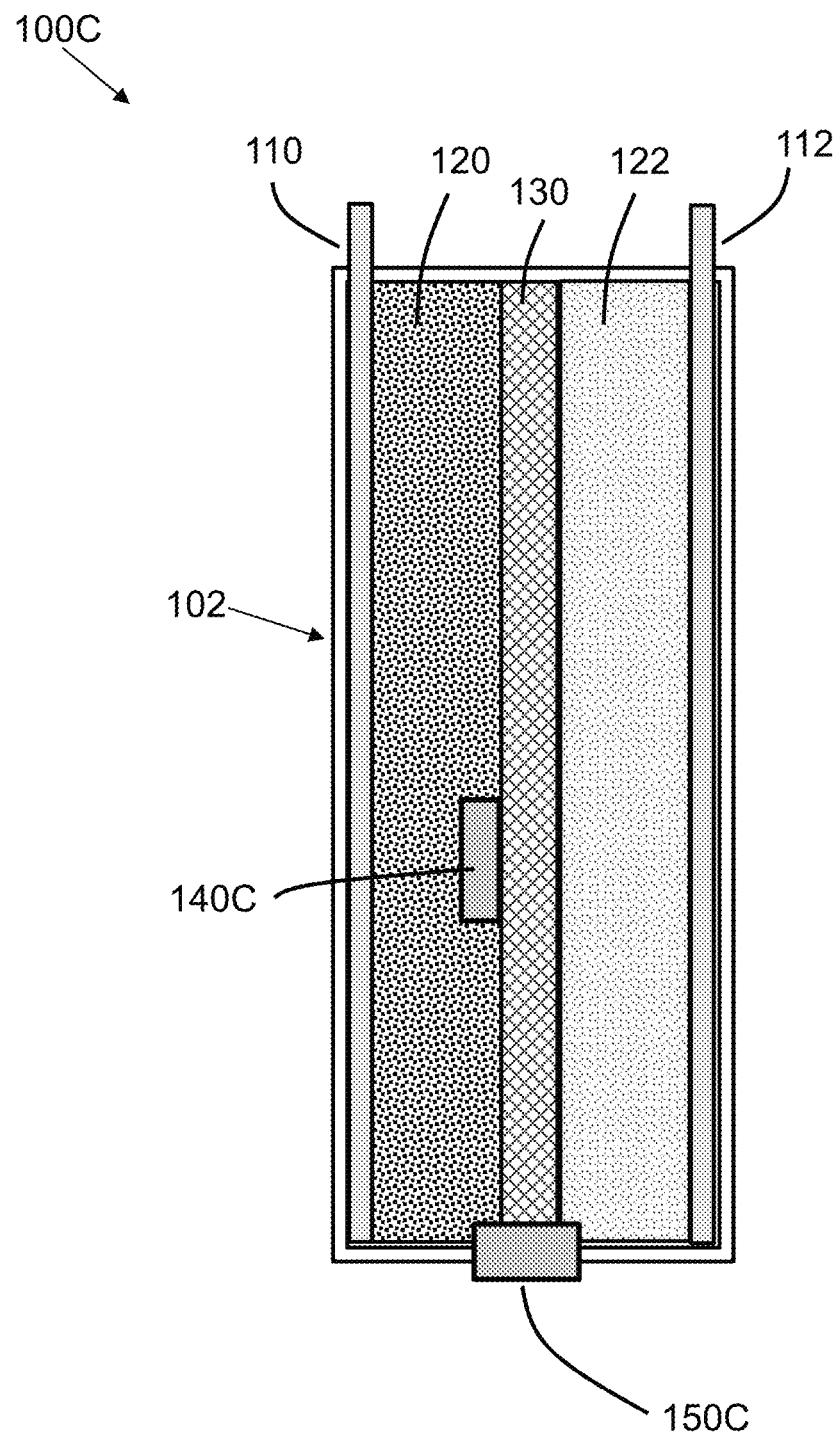
FIG. 1C illustrates a rechargeable battery system with a separator mounted mechanical impulse element.

FIG. 1C illustrates a rechargeable battery system 100C with a separator mounted mechanical impulse element. In this embodiment, vibratory mechanical impulses are provided by a piezoelectric element 140C attached to a separator 130 to cause mechanical movement and dislodgement of gas bubbles from at least one of the electrode materials 120 and 122 in response to activation. The dislodged gas bubbles can be released into atmosphere using a vent 150C that is at least partially situated in gaseous communication with both electrode materials 120 and 122.

Figure 1D:
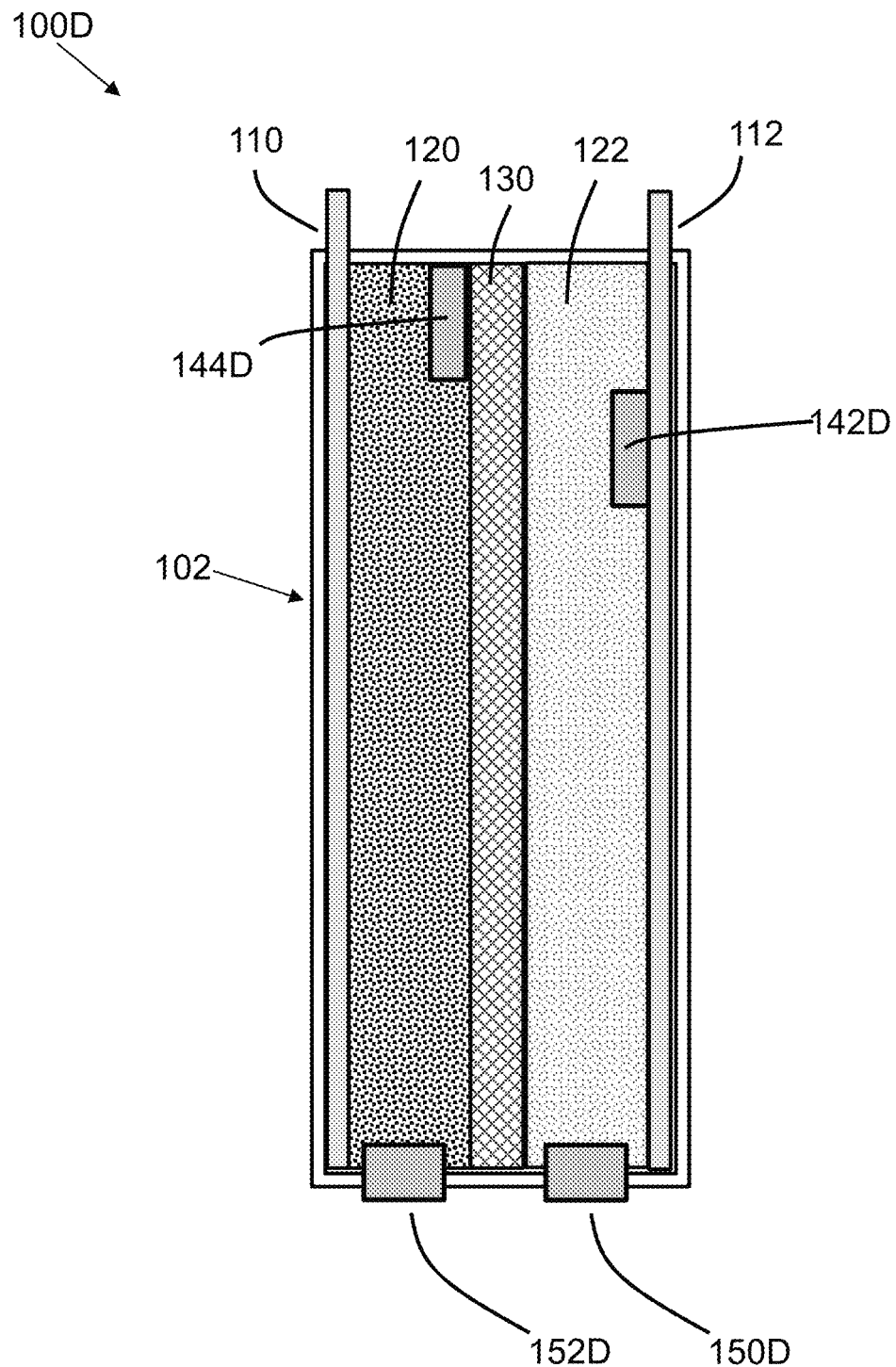
FIG. 1D illustrates a rechargeable battery system with a separator and collector mounted mechanical impulse element and multiple gas vents.

FIG. 1D illustrates a rechargeable battery system 100D with a separator and collector mounted mechanical impulse element and multiple gas vents. In this embodiment, vibratory mechanical impulses are provided by both a piezoelectric element 142D attached to a collector 112 and a piezoelectric element 144D attached to a separator 130 to cause mechanical movement and dislodgement of gas bubbles from the electrode materials 120 and 122 in response to activation. The dislodged gas bubbles can be released into atmosphere using either vent 150D and vent 152D that are at least partially situated in respective gaseous communication with both electrode materials 120 and 122.

Figure 1E:
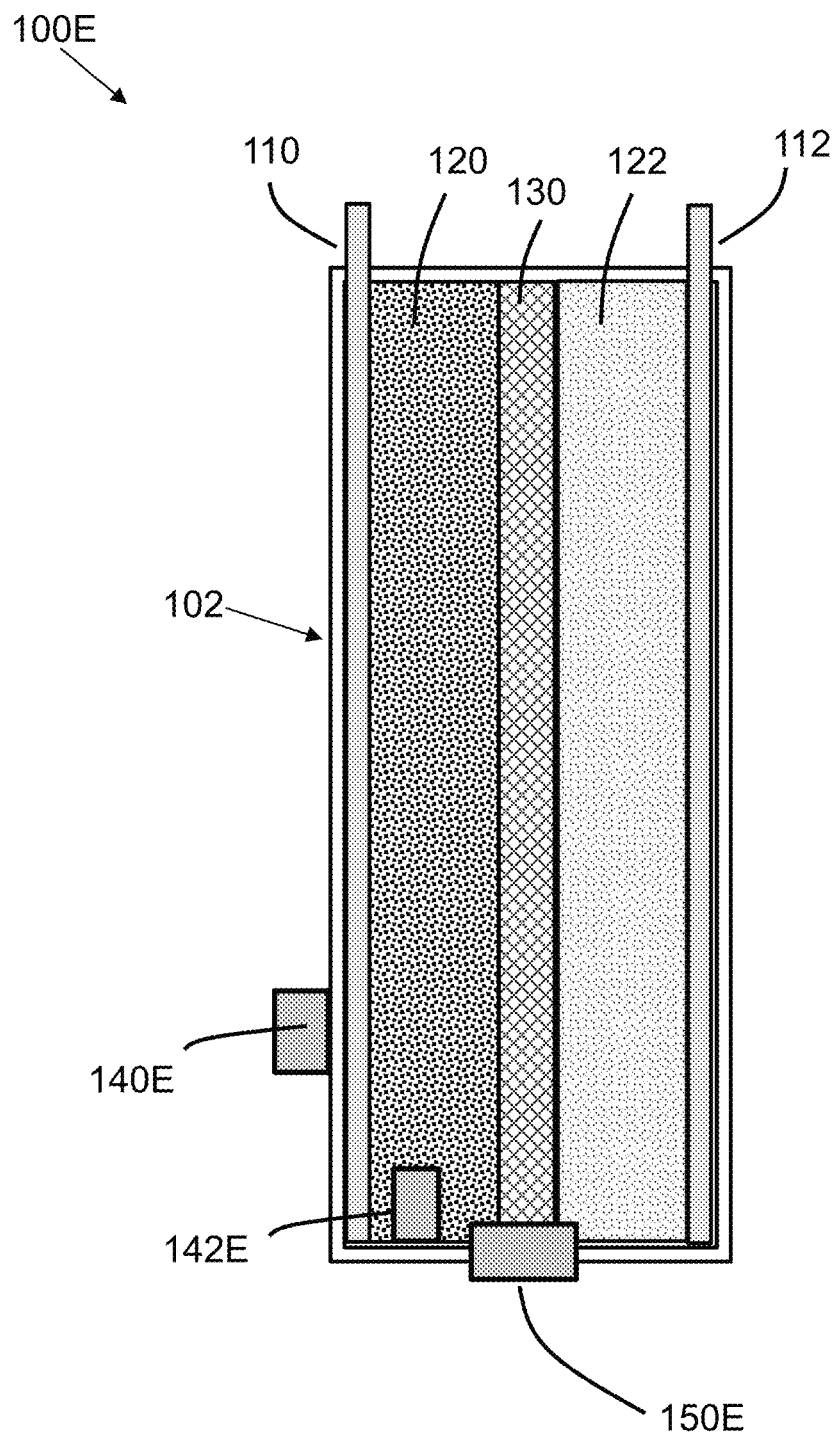
FIG. 1E illustrates a rechargeable battery system with multiple mechanical impulse elements both internally and externally mounted on a casing.

FIG. 1E illustrates a rechargeable battery system 100E with multiple mechanical impulse elements both externally and internally mounted on a casing. In this embodiment, vibratory mechanical impulses are provided by both a piezoelectric element 140E externally attached to the casing 122 and a piezoelectric element 142E internally attached the casing 122 to cause mechanical movement and dislodgement of gas bubbles from at least one of the electrode materials 120 and 122 in response to activation. The dislodged gas bubbles can be released into atmosphere using a vent 150E that is at least partially situated in gaseous communication with both electrode materials 120 and 122.

Figure 1F:
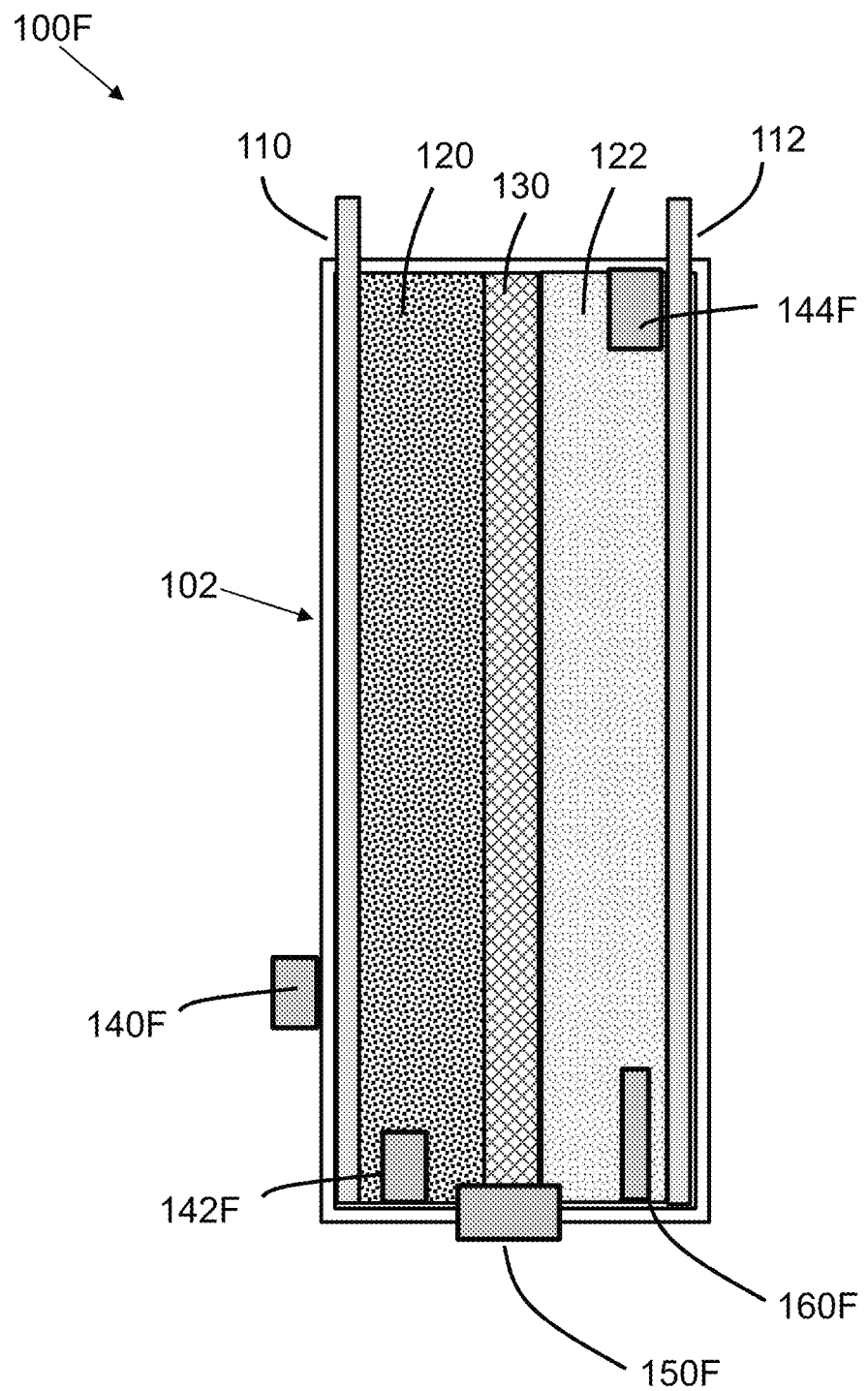
FIG. 1F illustrates a rechargeable battery system with a casing mounted mechanical impulse element and a gas pressure monitor.

FIG. 1F illustrates a rechargeable battery system 100F with a casing mounted mechanical impulse element and a gas pressure monitor. In this embodiment, vibratory mechanical impulses are provided by a piezoelectric element 140F externally attached to the casing 122, a piezoelectric element 142F internally attached the casing 122, and a piezoelectric element 144F internally attached to collector 112, with vibratory movement of one or more piezoelectric elements acting to cause mechanical movement and dislodgement of gas bubbles from at least one of the electrode materials 120 and 122 in response to activation. The dislodged gas bubbles can be released into atmosphere using a vent 150F that is at least partially situated in gaseous communication with both electrode materials 120 and 122. In this embodiment, activation of the piezoelectric elements can be in response to measured gas pressure using a gas pressure sensor 160F. The gas pressure sensor 160F can use pressure transducers, piezoelectric elements, capacitive elements, chemical sensors, or other testing systems able to directly or indirectly measure gas pressure. In some embodiments, a piezoelectric element used to create vibratory motion can also be used to provide gas pressure sensing.

Figure 2:
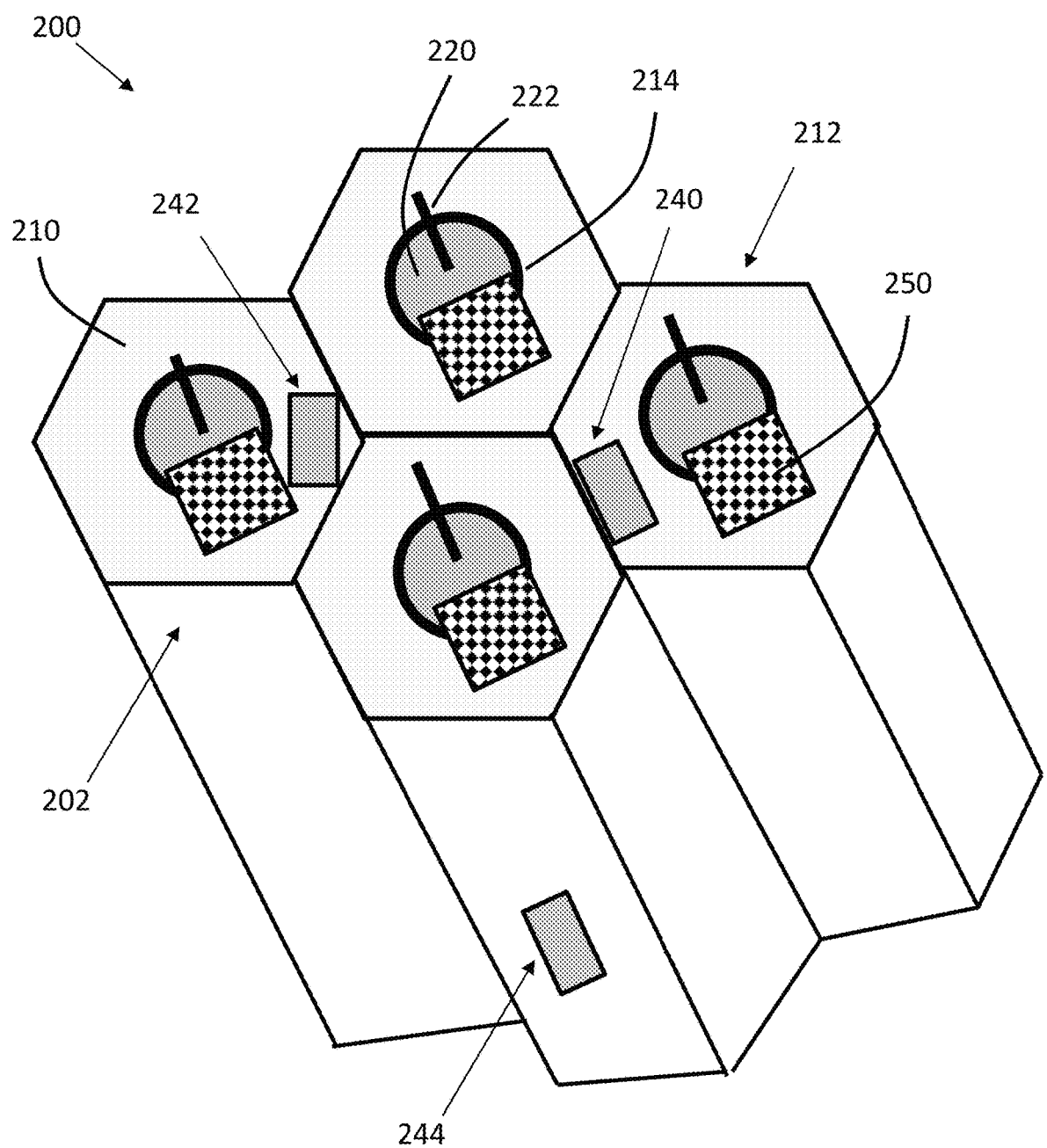
FIG. 2 illustrates a collector array acting as a casing and supporting multiple mechanical impulse elements.

FIG. 2 illustrates a collector array acting as a casing and supporting multiple mechanical impulse elements. In this embodiment a collector chamber is used to form at least a portion of a battery case. In this embodiment, the multiple electrically connected chambers 212 of the cathode collector array 202 can be defined as having cross sections that include polygonal, circular, hexagonal, square, rectangular, arcuate sections, other suitable combinations of regular or irregular cross sections, or contacting or electrically connectable chambers. In some embodiments chambers 212 can be regularly or irregularly shaped and positioned with respect each other but will commonly at least partially share at least one chamber sidewall with an adjacent chamber. The chambers 212 can sized to be less than 5 cm in average width, with cell width between 1 mm and 1 cm being typical. Similarly, height of the chambers 212 can be less than 20 cm in average height, with cell height between 1 mm and 10 cm being typical. In some embodiments chamber height can be greater than chamber width, while in others chamber height can be less than chamber width. Depending on application, shape, dimensions, width, and height of the chambers can be modified, with the collector array 102 supporting differing types of connected chambers.

Also supported in this embodiment are mechanical impulse elements 240, 242, and 244 similar to those described with respect to FIGS. 1A-F. The elements 240, 242, and 244 can be mounted to individual or multiple chambers that at least partially define a battery casing. Element 240 is shown mounted on an inside of the multiple electrically connected chambers 212, element 242 is shown mounted to contact multiple sidewalls of the multiple electrically connected chambers 212, and element 244 is shown mounted to an outside of the multiple electrically connected chambers 212. When activated, the elements 240, 242, and 244 can assist in dislodge of gas bubbles from at least one of the first and second electrode materials. The dislodged gas can be released using gas vent 250.

In some embodiments, a separator 214, anode material 222, and anode collector 122 positioned within the multiple electrically connected chambers 212 of the cathode collector array 102 can be defined as circular, hexagonal, square, polygonal or other shapes. In some embodiments the combination of separator 214, anode material 222, and anode collector 222 can be regularly or irregularly shaped. In some embodiments, the combination of the anode and the separator can fill chambers 212. In other embodiments, the combination of separator 214, anode material 222, and anode collector 222 can be sized to fit within chambers 212 and can sized to be less than 1 cm in average width, with cell width between 1 mm and 1cm being typical. Similarly, height of the combination of separator 214, anode material 222, and anode collector 222 can be less than 1 cm in average width, with cell width between 1 mm and 1 cm being typical. Depending on application, shape, dimensions, width, and height of the combination of separator 214, anode material 222, and anode collector 222 can be modified, with the collector array 202 capable of holding various combinations of separator 214, anode material 222, and anode collector 222.

In some embodiments, the anode collector can be one or more wires, strips, foils, pillars or other electrically conductive material that can be positioned in contact with anode material 220 and configured for electrical connection with other anode collectors 222. In some embodiments the anode collector 222 can extend significantly outward from the chamber 212, simplifying electrical interconnection of the anode collectors 222. Extending the anode collectors 222 outward from the chamber can also simplify sealing or covering the chamber and contained cathode and anode material, while still allowing access for electrical interconnection of the anode collectors 222.

Figure 3A:
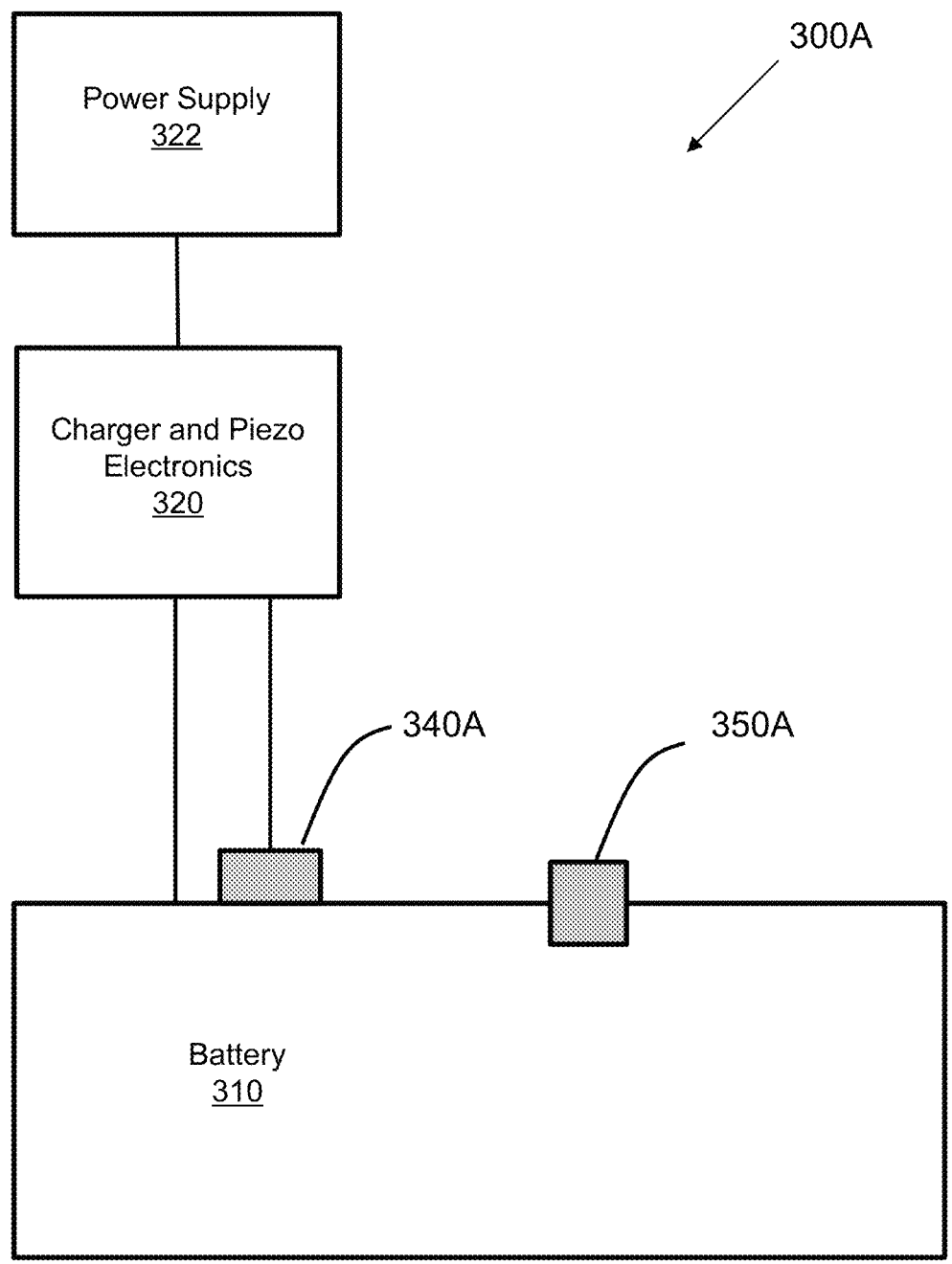
FIG. 3A illustrate a battery charging system with charger and piezoelectric electronics separately situated from a battery cell.

FIG. 3A illustrate a battery charging system 300A with charger and piezoelectric electronics separately situated from a battery cell. More specifically, a battery 310 containing electrode materials can have an attached mechanical impulse element 340A (e.g. a piezoelectric element) and a gas vent 350. Separate charger and piezo electronics 320 are connected to charge the battery system 310 and provide activation and power to the mechanical impulse element 340A. Power to charge the battery 310 and associated electronics can be provided by a power supply 322, which can be an AC or DC electrical power source.

Figure 3B:
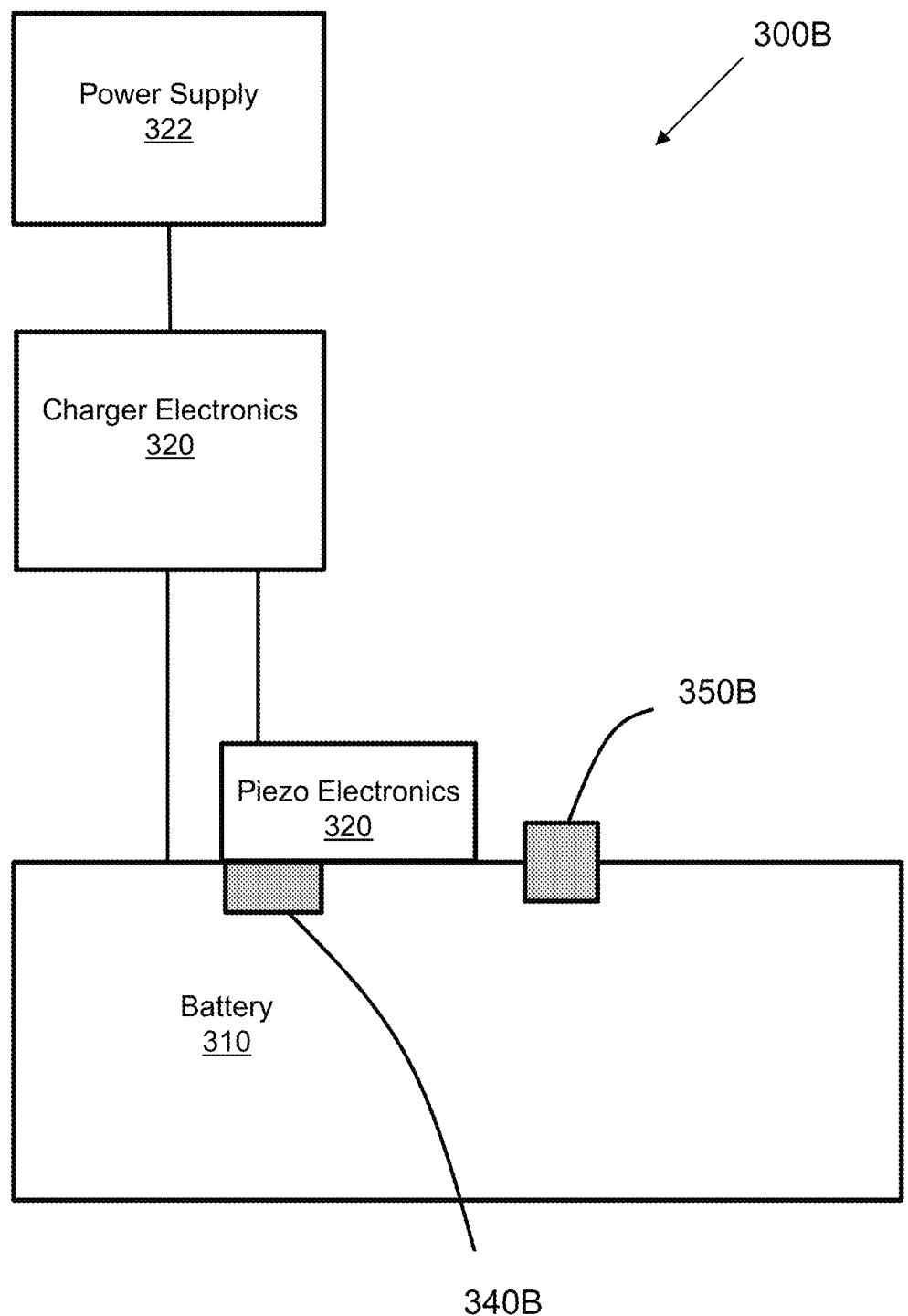
FIG. 3B illustrate a battery charging system with charger electronics separately situated from a battery cell.

FIG. 3B illustrate a battery charging system 300B with charger electronics separately situated from a battery cell. More specifically, a battery 310 containing electrode materials can have an attached mechanical impulse element 340B (e.g. a piezoelectric element) and a gas vent 350B. Separate charger electronics are connected to charge the battery system 310. Piezo electronics 320 can be attached to the battery 310 and provide activation and power to the mechanical impulse element 340B.

Figure 3C:
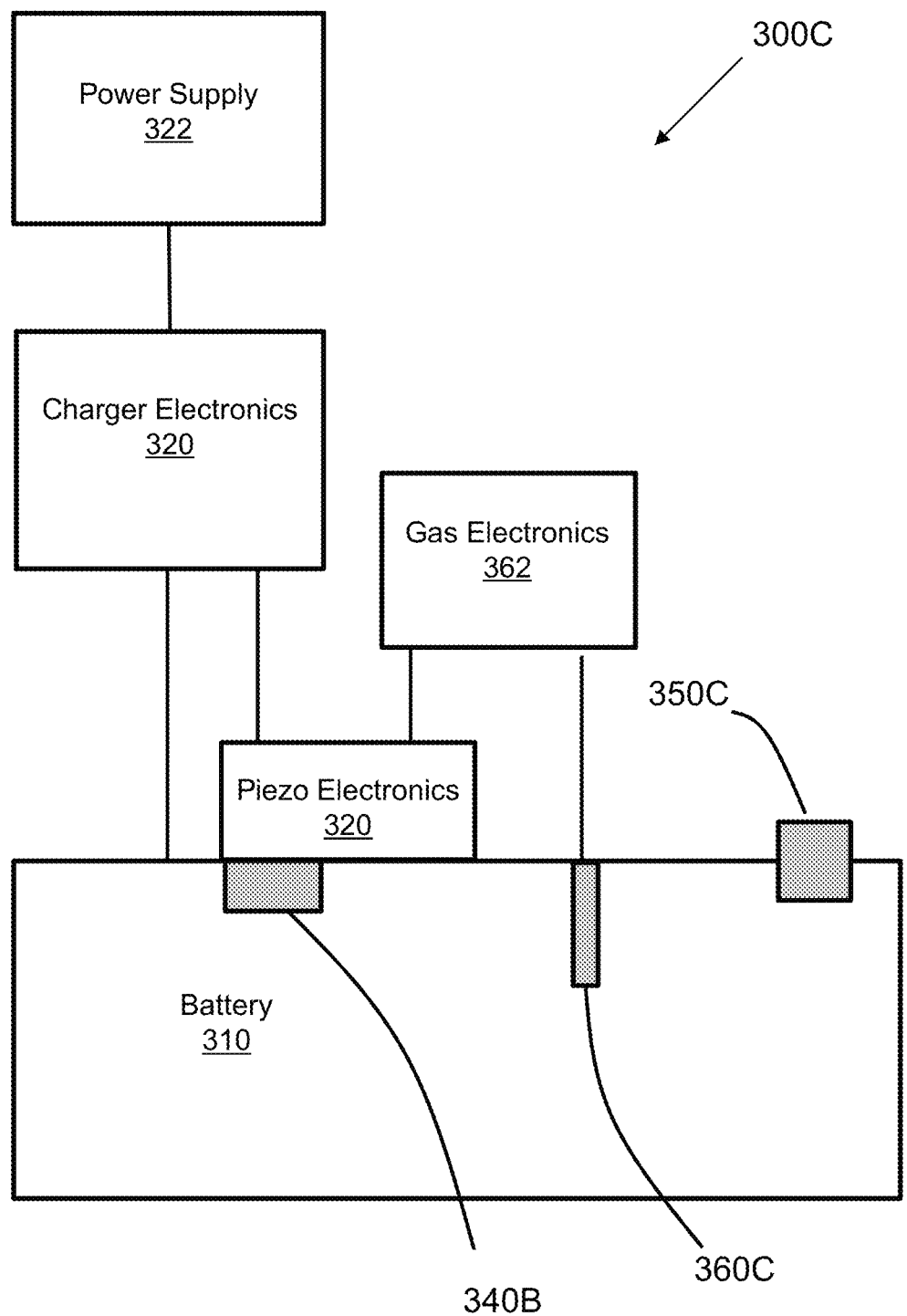
FIG. 3C illustrate a battery charging system with charger and gas pressure electronics separately situated from a battery cell.

FIG. 3C illustrate a battery charging system 300C with charger and gas pressure electronics separately situated from a battery cell. More specifically, a battery 310 containing electrode materials can have an attached mechanical impulse element 340C (e.g. a piezoelectric element) and a gas vent 350C. Separate charger electronics are connected to charge the battery system 310. Piezo electronics 320 can be attached to the battery 310 and provide activation and power to the mechanical impulse element 340C. In this embodiment, activation of the piezoelectric elements can be in response to measured gas pressure using a gas pressure sensor 360C and gas electronics 362 attached to piezo electronics 320.

Figure 4:
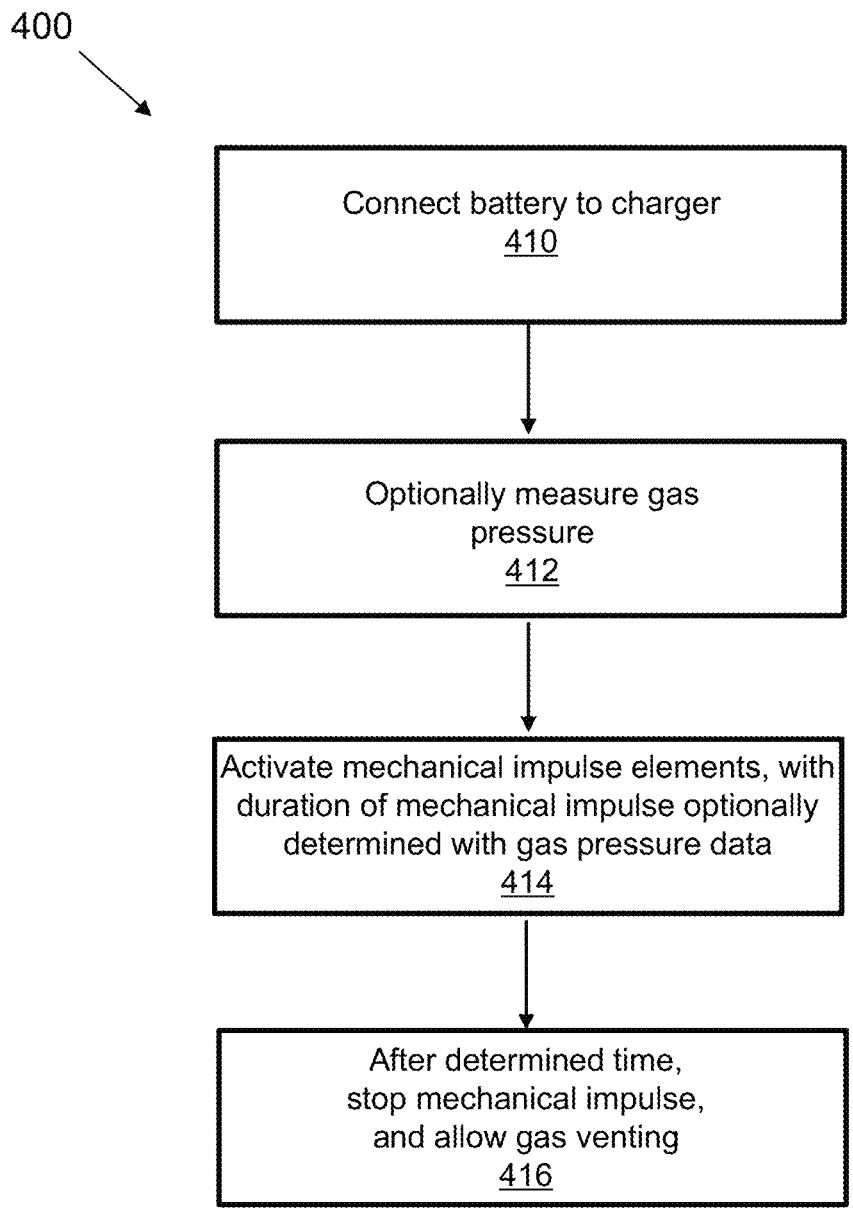
FIG. 4 illustrates a method of operating a battery charging system with charger, piezoelectric, and gas pressure electronics.

FIG. 4 illustrates a method 400 of operating a battery charging system with charger, piezoelectric, and gas pressure electronics. In this embodiment, in a first step 410 a battery having one or more mechanical impulse elements is connected to a charger or placed in a charger cradle. In optional step 412, gas pressure can be measured. In step 414, using gas pressure data if available, mechanical impulse elements can be activated with duration of mechanical impulse determined. In step 416, the mechanical impulse is stopped and gas venting is allowed to continue.

As will understood, the rechargeable battery cell system 100 of FIGS. 1A-F and rechargeable battery cell system 200 of FIG. 2 can also include anode material, cathode material, separators, ion exchange material, and other materials and components as described in the following:

Electrodes

Electrode material can include material formed as thin films, or structured patterns such as columns, needles, groove, or slots. In some embodiments electrodes can be loosely arranged materials, rigidly bound or sintered structures, or solid continuous pore structures. In one embodiment, electrodes can be formed from particles provided in various forms such as powders, granules, pellets, or nanomaterial. In certain embodiments, particles can have an average size (diameter or longest dimension) of between about 0.1 μm to 300 μm, and in a specific embodiment, between about 100 μm and 1 μm. In some embodiments, relatively homogeneous particle sizes can be used, while in other embodiments heterogenous sized materials can be used. Particles can be processed to increase effective surface area. In some embodiments, particles can be processed by heating, melting, fusing, or sintering to bind together the particles. In other embodiments, additional binders can be used to hold particles together. In some embodiments, air or other gas based electrodes can include structures for admitting air and providing active sites for chemical reactions.

Collectors

At least a portion of electrode material is placed in contact with a current collector. The current collector serves to supply an electric current so that it can be consumed for the electrode reaction during charge and collect an electric current generated during discharge. The current collector is typically formed from a material which has a high electrical conductivity and is inactive to electrochemical battery cell reaction. The current collector may be shaped in a plate form, foil form, mesh form, porous form-like sponge, punched or slotted metal form, or expanded metal form.

The material of the current collector can include Ni, Ti, Cu, Al, Pt, V, Au, Zn, and alloys of two or more of these metals such as stainless steel. Other embodiments can graphite cloth, copper sheet or mesh slotted woven brass.

Cathode and Anode Collector Material

At least a portion of anode and cathode electrode material is placed in contact with a respective current collectors. The current collectors serve to supply an electric current so that it can be consumed for the electrode reaction during charge and collect an electric current generated during discharge. The cathode and anode current collectors are typically formed from a material which has a high electrical conductivity and is inactive to electrochemical battery cell reaction. The current collectors may be shaped in a plate form, foil form, mesh form, porous form-like sponge, punched or slotted metal form, or expanded metal form. The material of the current collector can include Fe, Ni, Ti, Cu, Al, Pt, V, Au, Zn, and alloys of two or more of these metals such as stainless steel.

Anode and Cathode Material

Anode and cathode material can include material formed as thin films, or structured patterns such as columns, needles, groove, or slots. In some embodiments electrodes can be loosely arranged materials, rigidly bound or sintered structures, or solid continuous pore structures. In one embodiment, anode and cathode material can be formed from particles provided in various forms such as powders, granules, pellets, or nanomaterial. In certain embodiments, particles can have an average size (diameter or longest dimension) of between about 0.1 μm to 300 μm, and in a specific embodiment, between about 100 μm and 1 μm. In some embodiments, relatively homogeneous particle sizes can be used, while in other embodiments heterogenous sized materials can be used. Particles can be processed to increase effective surface area. In some embodiments, particles can be processed by heating, melting, fusing, or sintering to bind together the particles. In other embodiments, additional binders can be used to hold particles together.

Anode Composition

Anode composition can include a wide range of elements such as zinc, aluminum, magnesium, iron, and lithium and other metals in pure, oxide form or salt form, or combinations thereof capable of use in rechargeable electrochemical systems. In some embodiments, relatively pure Zn, ZnO or a mixture of Zn and ZnO can be used. For a rechargeable zinc negative electrode, the electrochemically active material is the zinc oxide powder or a mixture of zinc and zinc oxide powder. The zinc oxide can dissolve in an alkaline electrolyte to form the zincate ($Zn(OH)_4^{2-}$). Zinc oxide or/and zincate is reduced to zinc metal during the charging process.

More broadly, anode materials can include:

Any metal M, metal oxide MOx or metal salt having a redox potential E0 lower than the redox potential of the cathode material.

Any metal oxide MOx having a redox potential E0 lower than the redox potential of the cathode material.

Any alloy of any metals MM1M2 . . . Mn, mixed oxides or mixed salts having a E0 lower than the E0 of the cathode material.

Any polymer that can accommodate anions in its structure having a redox potential E0 lower than the redox potential of the cathode material.

Any mixture of one or more of the above mentioned type of materials.

Cathode Composition

Cathode composition can include a wide range of materials such as metal or metal containing compounds such as ferrate salts (Fe(VI)), permanganate salts (Mn (VII)), nickel hydroxide $Ni(OH)_2$, nickel oxyhydroxide NiOOH, manganese dioxide $MnO_2$ or any combinations capable of use in rechargeable electrochemical systems, and Silver/Silver Oxide.

More broadly, cathode materials can include:

Any metal M having a redox potential E0 larger than the redox potential of the anode material.

Any metal oxide MOx having a redox potential E0 larger than the redox potential of the anode material.

Any alloy of any metals MM1M2 . . . Mn having a E0 larger than the E0 of the anode material.

Any metal fluoride MFn having a redox potential larger than the anode material.

Any alloy MM1M2 . . . MnOxFm with n larger or equal to 2 and m being larger or equal to zero.

Any polymer that can accommodate anions in its structure having a redox potential E0 larger than the redox potential of the anode material.

CFx carbon fluoride with x being between zero and 2.

Salts not stable in aqueous electrolyte solutions, including but not limited to FeVI (iron six) based battery systems.

Any mixture of one or more of the above mentioned type of materials.

In some embodiments, wherein the cathode can include one or more additives selected from the group consisting of Bi, Cu, Sn, Pb, Ag, Co, Ni, Mg, K, Li, Al, Ca, Fe, Zn, V, Ba, Y, Ti, Sr, wherein the additive is in oxide or hydroxide form.

Additives and Binding Agents

Various additives can be used to improve electrochemical, electrical, or mechanical features of the electrodes. For example, electrochemical performance can be improved by addition of nickel, nickel hydroxide, nickel oxyhydroxide, or nickel oxide containing cathode material that can incorporate or be coated with small amounts of cobalt oxide, strontium hydroxide ($Sr(OH)_2$), barium oxide (BaO), calcium hydroxide ($Ca(OH)^2$), $Fe_3O_4$, calcium fluoride ($CaF_2$), or yttrium oxide ($Y_2O_3$) to improve battery cell performance. As another example, electrode can includes an oxide such as bismuth oxide, indium oxide, and/or aluminum oxide. Bismuth oxide and indium oxide may interact with zinc and reduce gassing at the electrode. Bismuth oxide may be provided in a concentration of between about 1 and 10% by weight of a dry negative electrode formulation. Indium oxide may be present in a concentration of between about 0.05 and 1% by weight of a dry negative electrode formulation. Aluminum oxide may be provided in a concentration of between about 1 and 5% by weight of a dry negative electrode formulation.

In certain embodiments, one or more additives may be included to improve corrosion resistance of the zinc electrode material. Specific examples of anions that may be included to reduce the solubility of zinc in the electrolyte include phosphate, fluoride, borate, zincate, silicate, oxalate or stearate. Generally, these anions may be present in an electrode in concentrations of up to about 10% by weight of a dry electrode formulation.

Additives that improve electrical characteristics such as conductivity can also be added. For example, a range of carbonaceous materials can be used as electrode additives, including powdery or fibrous carbons such as graphite, coke, ketjen black, and acetylene black. Carbonaceous nanomaterials can also be used such as single or multiwalled carbon nanotubes, carbon nanofibers, multi-layered carbon nanoparticles, carbon nanowhiskers, or carbon nanorods.

Additives may be provided as chemically homogeneous components into a mixture or solution, co-precipitated, or coated onto particles.

Mechanical properties can be improved in one embodiment by addition of binding agents to provide increased electrode mechanical strength, and flexure or crack reduction for the electrode. Binding agents may include, for example, polymeric materials such as polytetrafluoroethylene (PTFE), polyethylene (PE), polypropylene (PP), polyisobutylene (PIB), polyvinyl alcohol (PVA), polyacrylic acid, polyvinyl acetate, carboxy methyl cellulose (CMC), styrene butadiene rubber (SBR), polyethylene oxide (PEO) polybutylene terephthalate (PBT) or polyamides, polyvinylidene fluoride (PVDF), silicone-based elastomers such as polydimethyl siloxane (PDMS) or rubber materials such as natural rubber (NR), ethylene propylene rubber (EPM) or ethylene propylene diene monomer rubber (EPDM).

Ion Exchange Material

In some embodiments, ion exchange materials can be used as a separator or an additive that improves operation. The ion exchange material can be generally selective for the transport of either cations or anions. An anion selective ion exchange material can be used alone, a cation selective ion exchange material can be used alone, or they can be used in combination with each other. In one embodiment the ion exchange material can be an organic or polymeric material having attached strongly acidic groups, such as sulfonic acid including, sodium polystyrene sulfonate, or polyAMPS. Alternatively, the ion exchange material can be an organic or polymeric material having attached strongly basic groups, such as quaternary amino groups including trimethylammonium groups (e.g. polyAPTAC). In another embodiment, the ion exchange material can be an organic or polymeric material having attached weakly acidic groups, including carboxylic acid groups. Alternatively, the ion exchange material can be an organic or polymeric material having attached weakly basic groups, typically featuring primary, secondary, and/or tertiary amino groups (e.g. polyethylene amine).

The ion exchange material can be provided to interact with electrode material as a fully or partially embedding polymer, a particle mixture, a membrane or film, particulates or beads, a coating, or a separator. The anode alone, the cathode alone, or both the anode or cathode can be configured to interact with an ion exchange material, which can be the same or different material for the respective electrodes.

Electrolyte

An electrolyte is used to maintain high ionic conductivity between electrodes and inside electrode pores. Electrolytes can be aqueous based, solvent based, solid polymer, or an ionic liquid. In some embodiments, electrolytes can be semi-solid or gelatinized. Gelatinizing agents can include polymers that absorb the liquid of the electrolyte solution and swell. Such polymers can include polyethylene oxide, polyvinyl alcohol, and polyacrylamide.

In another embodiment the electrolyte can be a solid state electrolyte. In another embodiment electrolyte can be formed as a solid material with absorbed water. For example, KOH exposed to humid air.

In another embodiment electrolytes can be formed from ion exchange material such as explained above under "Ion exchange material" section.

In one embodiment aqueous alkaline electrolytes can be used. Alkaline electrolytes can include alkalis such as potassium hydroxide, sodium hydroxide, lithium hydroxide, calcium hydroxide or inorganic salts such as zinc bromide.

Separator

A separator may be replaced with (or used in conjunction with) an ion exchange membrane or film. A conventional porous polymer separator or ion exchange separator may be provided as a polymer membrane or film. Typically, a separator is disposed between the anode and the cathode and acts to prevent the anode and the cathode from having internal electrical shorts. In addition, the separator can also act to retain the electrolyte, particularly for battery systems that use different cathode and anode electrolyte solutions. The separator is generally required to have a porous structure or a structure having a number of perforations capable of allowing ions to pass while being chemically stable with respect to the electrolyte solution. In some embodiments, one or more separators can be formed by coating electrodes or particles that collectively form an electrode. The separator can be formed from a nonwoven fabric or a membrane having a micropore structure made of glass, polypropylene, polyethylene, resin, or polyamide. Alternatively, the separator may be constituted by a metal oxide film or a resin film combined with a metal oxide respectively having a plurality of perforations.

Processing

In one embodiment, a dry mixing process can be performed in which various anode and cathode materials, as well as additives and binders are mixed while dry. Optional processing steps such as heating, fusing, compressing, and melting ion exchange material can be performed before placing the mixture in a battery casing. In other embodiments, optional processing steps such as heating, fusing, compressing, and melting ion exchange material can be performed after placing the mixture in a battery casing. A liquid electrolyte can be added before sealing the battery casing.

According to other embodiments, a wet mixing process may instead be utilized. In a wet mixing process, one or more solvents are added at the beginning or during the mixing process, or, alternatively, one or more ingredients may be used in the form of a dispersion or suspension. The solvent(s) can be subsequently removed after the mixing process or later state in the production process.

In other embodiments, embodiment, the various individual components may be made using different methods. For example, some of the electrode may be produced using a dry mixing process, while portions of the electrode may be produced using a wet process. According to yet another embodiment, it is possible to combine both dry and wet processes for the different components.

Battery and Cell Design

The battery cells can have any of a number of different shapes and sizes. For example, coin, prismatic, pouch or cylindrical cells can be used. Cylindrical cells may have the diameter and length of conventional 18650, 26650, AAA cells, AA cells, A cells, C, or D cells or others. Custom cell designs can be used in some applications. For example, prismatic cell designs can be used for portable or vehicular applications, as well as various larger format cells employed for various non-portable applications. A battery pack can be specifically designed for particular tools or applications. Battery packs can include one or more battery cells and appropriate casing, contacts, and conductive lines to permit reliable charge and discharge in an electric device.

In the foregoing description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The foregoing detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A rechargeable battery cell, comprising:
   a casing;
   first and second electrode materials separately positioned in the casing; and
   a first mechanical impulse element positioned within the casing and in contact with an electrochemically active portion of the rechargeable battery cell comprising at least one of the first electrode and the second electrode, to mechanically move and dislodge gas bubbles generated during a use of the rechargeable battery cell comprising a charge, recharge or discharge operation of the rechargeable battery cell, from at least one of the first and second electrode materials in response to a first activation, wherein the gas bubbles adhere to at least one of the first electrode and the second electrode and reduce an electrical efficiency of the rechargeable battery cell prior to being dislodged by the mechanical impulse element.

2. The rechargeable battery cell of claim 1, wherein the mechanical impulse element is a vibratory element.

3. The rechargeable battery cell of claim 1, wherein the mechanical impulse element is a piezoelectric element attached to the casing and activatable to cause vibratory movement to dislodge gas bubbles from at least one of the first and second electrode materials.

4. The rechargeable battery cell of claim 1, further comprising a second mechanical impulse element attached externally to an outside of the casing to mechanically move and dislodge the gas bubbles from at least one of the first and second electrode materials in response to a second activation.

5. The rechargeable battery cell of claim 1, wherein the mechanical impulse element is attached internally within the casing.

6. The rechargeable battery cell of claim 1, wherein the mechanical impulse element is attached to at least one of the one of the first and second electrode materials, a separator, or a collector.

7. The rechargeable battery cell of claim 1, further comprising a gas vent.

8. The rechargeable battery cell of claim 1, further comprising a gas pressure sensor.

9. The rechargeable battery cell of claim 1, further comprising an electronics system attached to the rechargeable battery cell to control operation of the mechanical impulse element.

10. The rechargeable battery cell of claim 1, further comprising a separate charger electrically connectable to the rechargeable battery cell to control operation of the mechanical impulse element.

11. The rechargeable battery cell of claim 1, wherein the first electrode material is Zn and the second electrode material is $MnO_2$.

* * * * *